US009527212B2

(12) United States Patent
Artes et al.

(10) Patent No.: US 9,527,212 B2
(45) Date of Patent: Dec. 27, 2016

(54) METHOD FOR AUTOMATICALLY TRIGGERING A SELF-POSITIONING PROCESS

(71) Applicant: ROBART GMBH, Linz (AT)

(72) Inventors: Harold Artes, Linz (AT); Dominik Seethaler, Linz (AT); Michael Schahpar, Linz (AT)

(73) Assignee: Robart GmbH, Linz (AT)

( * ) Notice: Subject to any disclaimer, the term of this patent is extended or adjusted under 35 U.S.C. 154(b) by 165 days.

(21) Appl. No.: 14/377,515

(22) PCT Filed: Feb. 8, 2013

(86) PCT No.: PCT/AT2013/050031
§ 371 (c)(1),
(2) Date: Dec. 8, 2014

(87) PCT Pub. No.: WO2013/116887
PCT Pub. Date: Aug. 15, 2013

(65) Prior Publication Data
US 2016/0008982 A1    Jan. 14, 2016

(30) Foreign Application Priority Data

Feb. 8, 2012  (DE) ........................ 10 2012 201 870

(51) Int. Cl.
*B25J 9/16* (2006.01)
*G05D 1/02* (2006.01)
(Continued)

(52) U.S. Cl.
CPC ................ *B25J 9/1692* (2013.01); *B25J 5/00* (2013.01); *B25J 9/1664* (2013.01);
(Continued)

(58) Field of Classification Search
CPC ........... B25J 9/1692; B25J 5/00; B25J 9/1664; B25J 11/0085; G05D 1/0274; G05D 2201/0203; G05D 2201/0206; G05D 2201/0207; G05D 2201/0208; G05D 2201/0211; G05D 2201/0214; G05D 2201/0215; A63H 17/36
See application file for complete search history.

(56) References Cited

U.S. PATENT DOCUMENTS 5,793,934 A    8/1998  Bauer
6,667,592 B2  12/2003  Jacobs et al.
(Continued)

FOREIGN PATENT DOCUMENTS

DE          4421805 C1    8/1995
DE    102007010979 B3    5/2008
(Continued)

OTHER PUBLICATIONS

Jensfelt et al., "Active Global Localization for a Mobile Robot Using Multiple Hypothesis Tracking", IEEE Transactions on Robotics and Automation, vol. 17, No. 5, Oct. 2011.

*Primary Examiner* — Nicholas Kiswanto
(74) *Attorney, Agent, or Firm* — Laurence A. Greenberg; Werner H. Stemer; Ralph E. Locher

(57) ABSTRACT

A mobile self-propelled robot for autonomously carrying out actions. The robot includes a drive module for moving the robot over a floor area; a processing module for carrying out the activities during a processing stage; at least one sensor module for detecting information relating to the structure of the surroundings; a detector module configured to detect a displacement of the robot prior to or during the processing stage. Further, the robot includes a navigation module configured to navigate the robot over the floor area during the processing stage using a map of the surroundings, to store and manage one or more maps of the surroundings, and to (Continued)

carry out a self-positioning process if the detector module has detected a displacement of the robot. During the self-positioning process, the presence and the location of the robot within the stored maps are detected.

23 Claims, 3 Drawing Sheets

(51) Int. Cl.
  *B25J 5/00* (2006.01)
  *B25J 11/00* (2006.01)
(52) U.S. Cl.
  CPC ........ *B25J 11/0085* (2013.01); *G05D 1/0274* (2013.01); *G05D 2201/0203* (2013.01); *Y10S 901/01* (2013.01)

(56) References Cited

U.S. PATENT DOCUMENTS

| | | | | |
|---|---|---|---|---|
| 8,024,072 | B2* | 9/2011 | Park | B25J 5/00 700/259 |
| 8,584,306 | B2* | 11/2013 | Chung | G05D 1/0242 15/319 |
| 8,838,274 | B2 | 9/2014 | Jones et al. | |
| 2005/0182518 | A1 | 8/2005 | Karlsson | |
| 2005/0192707 | A1 | 9/2005 | Park et al. | |
| 2006/0064202 | A1 | 3/2006 | Gutmann et al. | |
| 2006/0220606 | A1* | 10/2006 | Jeon | G05D 1/021 318/587 |
| 2007/0118248 | A1 | 5/2007 | Lee et al. | |
| 2007/0282484 | A1 | 12/2007 | Chung et al. | |
| 2009/0182464 | A1 | 7/2009 | Myeong et al. | |
| 2009/0306822 | A1 | 12/2009 | Augenbraun et al. | |
| 2010/0152945 | A1 | 6/2010 | Park et al. | |
| 2011/0010033 | A1 | 1/2011 | Asahara et al. | |
| 2013/0211648 | A1* | 8/2013 | Yamamura | G05D 1/021 701/22 |
| 2014/0373497 | A1* | 12/2014 | Bjorn | A01D 75/18 56/10.2 R |
| 2015/0150428 | A1* | 6/2015 | Park | A47L 11/4005 134/18 |

FOREIGN PATENT DOCUMENTS

| | | |
|---|---|---|
| EP | 1541295 A1 | 6/2005 |
| EP | 1967116 A1 | 9/2008 |
| EP | 2256574 A1 | 12/2010 |
| EP | 2287697 A2 | 2/2011 |
| JP | 2005216021 A | 8/2005 |
| JP | 2007149088 A | 6/2007 |
| JP | 2008097088 A | 4/2008 |

\* cited by examiner

METHOD FOR AUTOMATICALLY TRIGGERING A SELF-POSITIONING PROCESS

TECHNICAL FIELD

The present description relates to a method for automatically triggering a self-localization process, in particular an automatic global self-localization process of a self-propelled autonomous robot (for example robotic vacuum cleaners).

BACKGROUND

Numerous self-propelled robots for cleaning or treating floor areas are known and are commercially available. In principle, the intention is to treat the floor area as completely as possible in the shortest possible time. Random navigation methods are used in simple systems (for example EP 2287697 A2 by iRobot Corp.), which methods manage without creating or using a map of the environment in which the floor area to be treated is situated. That is to say, no local information relating to obstacles, floor area boundaries, cleaned/uncleaned areas, etc. is used. In combination with local movement strategies, only the direction of travel is (randomly) changed in the event of a collision with an obstacle. As a result, repeated cleaning of floor areas, for example, is accepted without being able to give a guarantee (in finite time) for complete cleaning of the floor area.

More complicated systems create a map of the environment for targeted path planning and targeted cleaning of the floor area using a SLAM algorithm (SLAM: "Simultaneous Localization and Mapping"). In this case, a map and the position of the robot in the map are determined using external sensors (laser range scanner, triangulation by means of a camera and laser, contact sensors, etc.) and inertial sensors (odometric sensors, acceleration sensors, etc.). In recent cleaning robots which use such a SLAM module, the map created is not permanent, that is to say a new map is created for each new cleaning operation (that is to say after the conclusion of a preceding cleaning operation).

In contrast to non-permanent maps, the use of permanently stored maps enables more efficient treatment operations since there is no need to repeatedly explore the environment. A treatment operation can therefore be calculated in advance. In this case, additional map-based information can be determined and reused (for example problem areas, heavily soiled areas, etc.). However, user-specific information, for example room designations, areas which require more intensive cleaning or blocked areas, the input of which would not be useful in non-permanent maps, can also be adopted. In U.S. Pat. No. 6,667,592 B2 by Intellibot, a stored/permanent map is used, for example, to assign (possibly different) functions (for example vacuuming, wiping) of individual sections to a map, which functions can then be autonomously executed by a cleaning device. In U.S. 2009/0182464 A1 by Samsung, the available map is broken down into sections which are then cleaned sequentially.

A basic prerequisite for robots which permanently store maps is that the robot can autonomously locate itself in the permanent map without or with only very limited prior knowledge of its actual position relative to the map. This ability is also referred to as global self-localization.

Such a method is described, for example, in "Active Global Localization for a Mobile Robot using Multiple Hypothesis Tracking", IEEE Transactions on Robotics and Automation, 2001.

However, a self-localization process which is carried out according to such a method may last for a very long time, depending on the size and number of available maps. During this time, the robot is partially shut down for its actual task, for example approaching a destination, as a result of which the execution of tasks is delayed.

The object on which the invention is based is now to provide an autonomous robot which carries out a self-localization process as rarely as possible, in particular only when it proves to be necessary, in order to save time and energy for the actual execution of tasks.

SUMMARY OF THE INVENTION

This stated object is achieved by means of a mobile robot according to the claims. The dependent claims relate to different examples and further developments of the invention.

A mobile, self-propelled robot for autonomously carrying out activities is described below. According to one example of the invention, the robot has the following: a drive module for moving the robot over the floor area; a processing (treatment) module for carrying out the activities during a processing (treatment) operation; at least one sensor module for acquiring information relating to the structure of the environment and/or relating to the floor area; a detector module which is designed to detect shifting of the robot before or during a processing operation; and a navigation module which is designed to navigate the robot over the floor area during the treatment operation using a map of the environment, to store and manage one or more maps of the environment, and to carry out a self-localization process when the detector module has detected shifting of the robot, in which case, during the self-localization process, it is detected whether and where the robot is situated within the stored maps.

A method for automatically carrying out activities with the aid of a self-propelled, autonomous robot is also described. According to one example of the invention, the method has the following: storing and managing at least one map of the environment; starting the treatment operation and carrying out the activities with the aid of a treatment module arranged on the robot; navigating the robot over the floor area during the treatment operation using a map of the environment; acquiring information relating to the structure of the environment and/or relating to the floor area during the treatment operation by means of at least one sensor module arranged on or in the robot; carrying out a self-localization process if a detector module arranged on or in the robot detects that the robot has been shifted, in which case, during the self-localization process, it is detected whether and where the robot is situated within the stored maps.

The examples and technical features of the mobile robot which are described in connection with the treatment of a floor area can also be applied to a mobile robot for carrying out other or additional activities. The activities carried out by the mobile robot described may also comprise, for example, the treatment of floor areas, the inspection of the floor area or the environment, the transport of objects, the cleaning of air and/or the carrying out of entertainment games. A treatment module is not absolutely necessary when solely used for inspection, for example.

BRIEF DESCRIPTION OF THE FIGURES

The following figures and the further description are intended to help to better understand the invention. The elements in the figures should not necessarily be understood as a restriction, rather importance is placed on describing the principle of the invention. In the figures, identical reference symbols denote identical or similar components or signals with an identical or similar meaning. In the figures.

DETAILED DESCRIPTION

Figure 1:
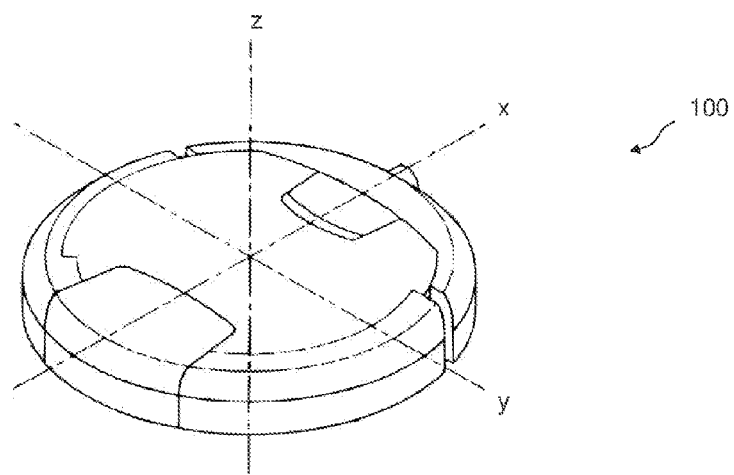
FIG. 1 shows, by way of example, a schematic isometric illustration of a self-propelled robot for autonomously cleaning floor areas.

FIG. 1 shows, by way of example, a schematic isometric illustration of a self-propelled robot 100 for autonomously cleaning floor areas. FIG. 1 also shows a Cartesian coordinate system with the origin in the center of the robot 100. Such devices are often—but not necessarily—in the form of a disk. The vertical axis z passes through the center of the disk. The longitudinal axis is denoted with x and the transverse axis is denoted with y.

The robot 100 comprises a drive module (not illustrated) which may have electric motors, gears and wheels, for example. The drive module may be designed, for example, to move the robot in the forward and reverse directions (this would be along the x axis in the illustration from FIG. 1) and to rotate the robot about the vertical axis (this would be the z axis in the illustration from FIG. 1). Therefore, the robot can—theoretically—approach any point of a floor area (which is parallel to the plane defined by the x axis and y axis). The robot also comprises a treatment module, for example a cleaning module, which is designed to clean the floor area under (and/or beside) the robot. For example, dust and dirt particles are drawn into a collection container or conveyed into the latter in a mechanical (or any other) manner. Such robots are known—as such—and differ substantially in terms of the type of navigation in the environment and the "strategy" used when treating the floor area, for example in a cleaning operation.

Robots which manage without creating or using a map are known. In such relatively simple systems, random navigation methods are generally used. No location-based information, for example information relating to obstacles or orientation points, is stored and reused during the treatment operations. In combination with local movement strategies, such robots generally (randomly) change the direction of travel in the event of collision with an obstacle. In this manner, some floor areas are repeatedly cleaned in an area to be cleaned, while other floor areas are possibly not cleaned at all.

More complicated systems were developed for this reason, which systems determine a map of the environment and, at the same time, the corresponding position of the robot in this map. Such methods are known and are referred to as SLAM methods (Simultaneous Localization and Mapping, see, for example, H. Durrant-Whyte and T. Bailey: "Simultaneous Localization and Mapping (SLAM): Part I The Essential Algorithms", in: IEEE Robotics and Automation Magazine, vol. 13, no. 2, pages 99-110, June 2006). This enables targeted navigation. In this case, the map and the position of the robot in the map can be determined using one or more sensors.

In some known systems, a new map is created for each new cleaning operation, that is to say the maps are not permanent. In such systems, it is irrelevant to the robot whether it has been shifted, for example, to another room by a user between two cleaning operations since it automatically creates a new map for each new treatment operation.

In comparison with systems with temporary maps, systems in which the maps created by the robot are permanently stored and reused for subsequent cleaning operations enable more efficient treatment operations since there is no need to repeatedly explore the environment. In addition, map-based information can be determined and reused. For example, heavily soiled areas can be marked in the map and can be given special treatment in a subsequent cleaning operation. User-specific information, for example room designations, can also be adopted. However, when reusing stored maps, it is necessary to be able to efficiently deal with shifting of the robot, for example to an area of another stored map, between and, in particular, before the treatment operations.

Figure 2:
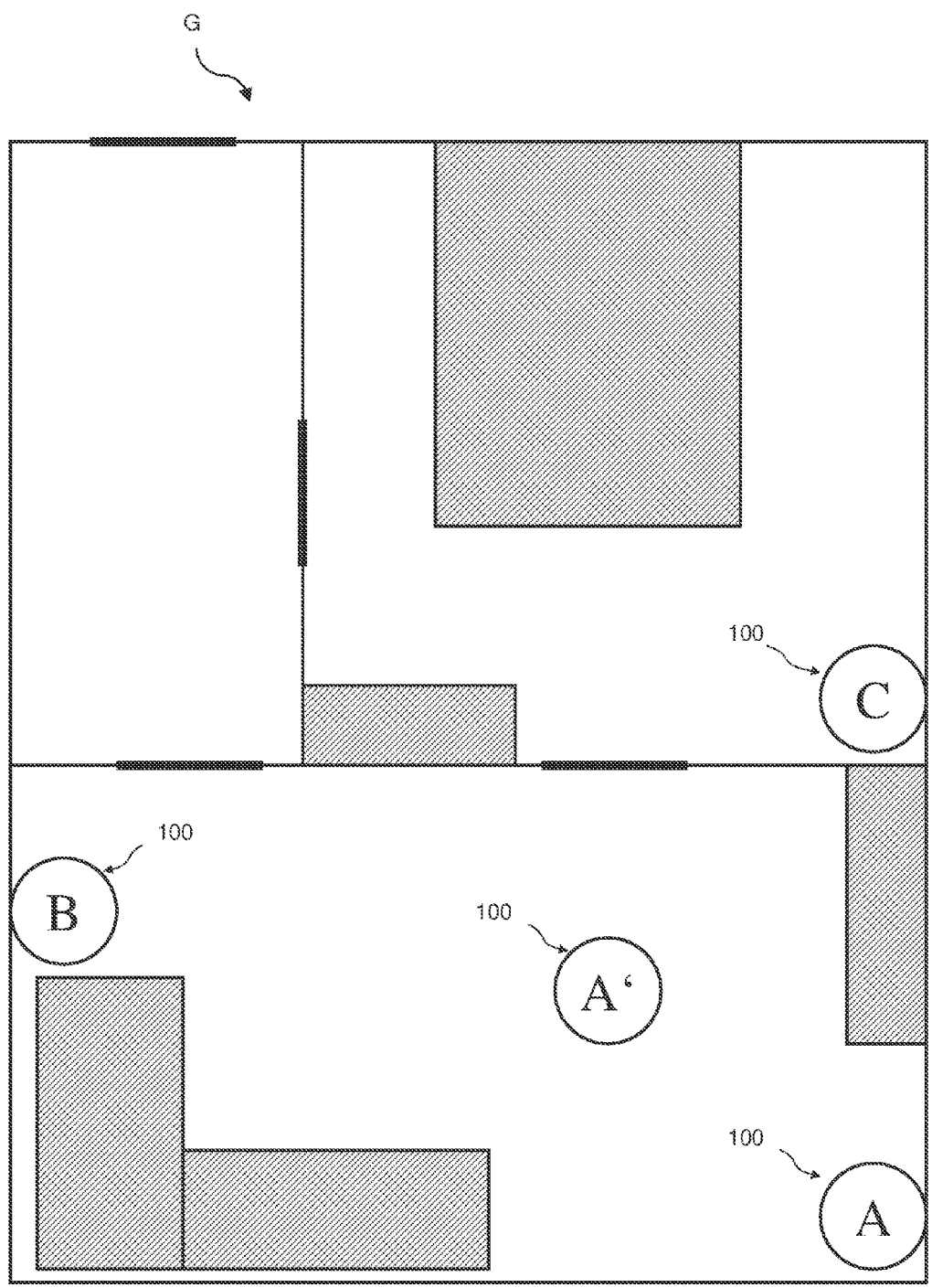
FIG. 2 shows an exemplary illustration of a self-propelled robot for autonomously cleaning floor areas at different positions in an area to be cleaned.

FIG. 2 shows, by way of example, an autonomous robot 100 at a position A within an area G to be cleaned. The area G to be cleaned is subdivided in this case into different rooms which are connected to one another by means of doors. In this case, different objects (hatched areas) may be situated in the individual rooms. If the robot 100 finishes a cleaning operation at the position A, for example, it generally stores this position. At the start of the next cleaning operation, the robot 100 therefore knows the place in the map used at which it is situated. However, for this purpose, it is necessary for the robot 100 to start the next cleaning operation from the position A again. However, if the robot 100 is shifted to another position B in the same room or else to a position C in another room of the area G to be cleaned before the next cleaning operation, for example, the position A stored at the end of the previous cleaning operation does not match the actual starting position B or C of the next cleaning operation.

A user could also shift the robot 100 during a cleaning operation to another place B or C, for example from the position A'. The robot 100 would therefore have to continue the already started cleaning operation from another position. If the robot 100 has stored a plurality of maps, for example one map for each floor of a building, it is also possible that the robot 100 is shifted not only within one map but rather from one map to another.

For this reason, such a robot 100 can generally carry out a so-called global self-localization process before it begins a cleaning operation. In this case, global self-localization means that the robot 100 autonomously locates itself in a permanent map without or only with very limited prior knowledge of its actual position relative to the map. In this case, the robot 100 may start, for example, to actively construct a new temporary map by means of new exploration ("Active Global Self-Localization"). In this case, the robot 100 repeatedly compares the new temporary map, even during construction, with all stored maps until sufficient certainty with respect to successful or unsuccessful localization has been achieved.

In this case, the robot 100 autonomously determines global localization hypotheses in the stored maps. This means that it checks different criteria in order to be able to uniquely assign the current location to a position in the map. The robot can determine, for example, the direction in which and the distance at which a door, walls or particular items of furniture are situated. The number of possible positions can be restricted with each identified feature.

Figure 3:
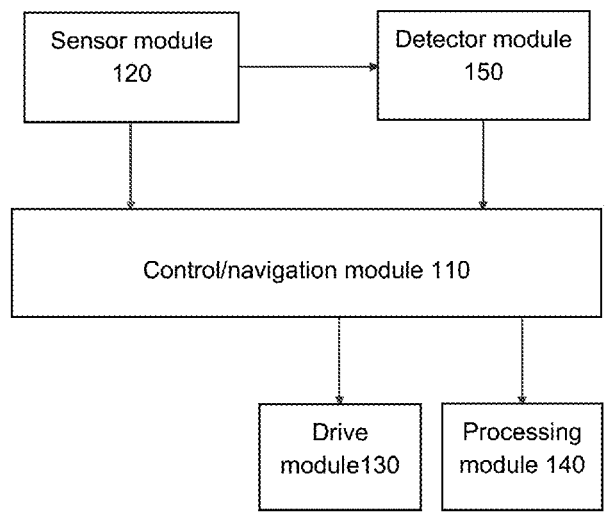
FIG. 3 uses a block diagram to show, by way of example, the structure of a robot according to the invention for autonomously treating floor areas.

FIG. 3 is a block diagram which illustrates the schematic structure of an example of a robot according to the invention for autonomously treating (for example cleaning) floor areas. A drive module 130 and a treatment module 140 which have already been mentioned above are illustrated. Both modules 130 and 140 are controlled by a control and navigation module 110. The navigation module is designed to navigate the robot over the floor area during a cleaning operation using a map of the environment. In this case, the map is stored in a memory of the control and navigation module 110 in the form of map data. Different strategies for planning the desired trajectory of the robot are known for the purpose of navigation in the environment. An attempt is generally made to cover the floor area to be treated (for example to be cleaned) as completely as possible with the shortest possible trajectory in order to ensure treatment (for example cleaning) which covers the area.

The robot 100 also comprises a sensor module 120 for acquiring information relating to the structure of the environment and/or relating to properties of the floor area. For this purpose, the sensor module may have one or more sensor units which are designed to acquire information, on the basis of which a map of the environment can be constructed and the position of the robot on the map can be located. Sensors suitable for this purpose are, for example, laser range scanners, cameras, triangulation sensors, contact sensors for detecting a collision with an obstacle, etc. As already described, a SLAM method can be used to construct the map and to simultaneously determine the position of the robot within the map.

In the event of successful localization, the (temporary) map newly constructed in this manner and the permanent localization map corresponding to the latter can be meaningfully combined in order to update possible differences. During localization, for example, new objects might be present or previously present objects might have been removed. In this case, the localization hypotheses should have a sufficiently high quality, that is to say a minimum number of unique matches between the new map and the stored map should have been found.

Localization fails if no localization with a sufficiently high quality can be achieved. In such a case, the robot 100 can generate a map of the current environment from the data obtained during localization, for example, and can store this map as a new map. A map obtained in this manner is therefore also available for future cleaning operations.

In this case, a global self-localization process of the robot 100 is triggered autonomously. For this purpose, the robot 100 has a detector module 150, for example. In this case, the detector module 150 may be in the form of a separate module but could also be integrated in the navigation module 110 or the sensor module 120, for example. The detector module 150 is designed to detect whether the robot 100 is shifted. This detection can be carried out in different ways. For example, the robot 100 could detect lifting and subsequent return of the robot 100. For this purpose, the robot could have, for example, one or more contact switches on spring-loaded wheels (not shown) which can be used to detect the lifting and subsequent return. A further possibility would be for the sensor module 120 to contain an inertial sensor, for example a gyroscope. Inertial sensors can measure translational and rotational accelerations. If the robot 100 is relocated, this sensor would provide higher values than at a standstill or during normal navigation during a cleaning operation. These exemplary solutions would make it possible to detect shifting of the robot both before and during a cleaning operation. Alternatively, the lifting could be detected by so-called "crash sensors" (also referred to as "cliff sensors"). This is substantially a reflection light barrier (reflection optocoupler) which is arranged on the underside of the device (preferably on the edge in order to detect the edge of a stair, for example), the light beam being reflected by the floor and being reflected to the reflection light barrier. Reflection no longer occurs when the device is lifted. After return, reflection is there again and a self-localization process can be triggered.

However, after being switched on, the robot 100 could also use other sensors in the sensor module 120 to detect that it is not at the same position as during switch-off. For this purpose, the position during switch-off would have to be stored. If the data provided by the sensors during switch-on, for example distances to objects which could be detected using laser range scanners, for example, are not consistent with the position stored last, this is an indication that the robot 100 has been shifted.

If shifting of the robot 100 is therefore detected, a global self-localization process is automatically triggered. In this manner, there is no need to automatically carry out a self-localization process before each new cleaning operation if the robot 100 has not been shifted. This is advantageous, in particular, when the robot 100 has stored many and/or very complex maps and the self-localization process would take up a relatively long time. Furthermore, it is possible to detect shifting at any time, that is to say even during a cleaning operation. One or more of the methods described above and/or methods other than the methods described above can be used for detection.

It is likewise possible for the robot to use the data provided by the sensors or contact switches to determine the probability with which it is still within the same map as before the shifting. For example, the robot 100 can carry out a time measurement between lifting and subsequent return. If such a time measurement results in only a short period, the robot 100 can assume, with a relatively high degree of probability, that it has been shifted only slightly from its original position and is still within the same map. In contrast to this, the probability of the robot being in another map if the period between lifting and subsequent return is very long increases.

The sensor units which provide the environment information needed to construct the map can also be used, for example, to detect obstacles which have not yet been recorded on an existing map. Contact sensors can detect a collision, and current sensors for measuring the load current of the drive unit can be used to detect, for example, when the robot is stuck (for example on the fringes of a rug). Other sensor units can detect sticking of the robot, for example, by virtue of the fact that the drive wheels spin. It is possible to provide further sensor units which are designed, for example, to determine the degree of soiling of the floor. The acquired environment information can be transmitted, together with a position of the robot on the map which is assigned to the respective information, to the control and navigation module 110.

Figure 4:
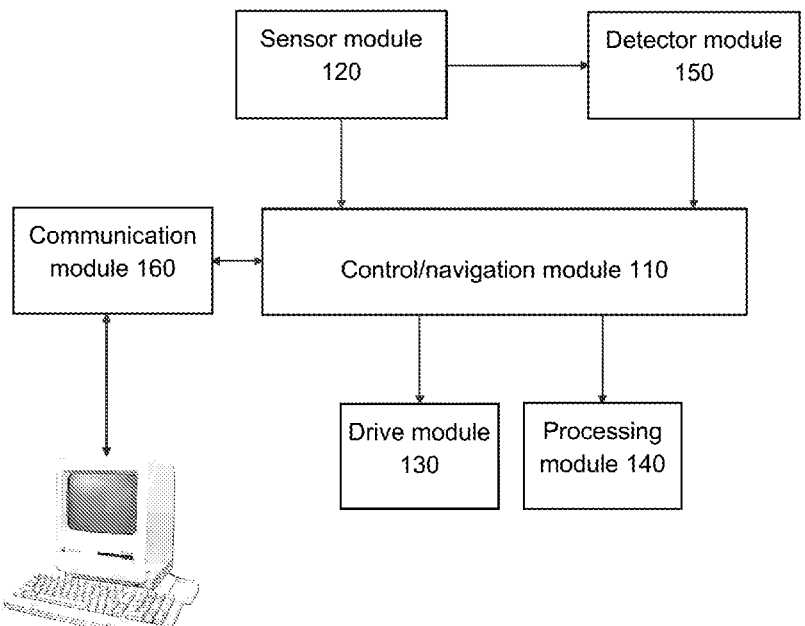
FIG. 4 uses a block diagram to show another example of a robot according to the invention for autonomously treating floor areas.

FIG. 4 shows another example of a robot according to the invention for autonomously treating floor areas. In this case, a communication module 150 is provided for the purpose of establishing a communication connection to a human-machine interface 200 (HMI). In this case, a personal computer (PC) comes into consideration as a human-machine interface 200 but it may also be only a simple display on the robot housing. The user can input a control command using a PC or a button arranged on the robot housing, for example. It goes without saying that other variants of human-machine communication are also known. This human-machine interface 200 makes it possible to present the stored information with the corresponding positions to a user and therefore makes it possible for the latter to intervene in the treatment operation (or alternatively an inspection operation) or to change the environment. As a result of the user inputting a control command, the human-machine interface 200 makes it possible to terminate, modify, continue or restart the treatment operation (or the inspection operation).

For example, the user could use the human-machine interface 200 to inform the robot 100 of the desired section or a subset of the maps to be considered. If the user shifts the robot from the first floor to the second floor, for example, he can inform the robot 100 of this using a user message "second floor", for example. The user could also use a user message "new map", for example, to inform the robot 100 that the robot 100 is in an area for which a map has not yet been stored. The robot 100 therefore knows the map in which it must carry out the localization process or whether it must create a new map. In the case of a very large number of stored maps, this can considerably reduce the time needed for the localization process. Even if the rooms on the different floors are very similar, for example in hotels, such a user input can considerably reduce the localization times and increase the corresponding prospects of success.

The function of a robot 100 according to the invention for autonomously treating floor areas is explained in more detail below using two case examples.

First Example the robot begins with an exploration of a two-story apartment on the first floor and in the process creates a map of the first floor and stores it under "map 1" after concluding the exploration. It then carries out a cleaning operation of "map 1" and returns to its base station after concluding the cleaning operation. The user then renames the stored map "map 1" to "first floor" using a human-machine interface.

During its next cleaning operation of "first floor", the robot is lifted and shifted to the second floor of the apartment. The robot detects that it has been shifted (lifting followed by return) and triggers a global self-localization process. In this case, it creates a new, initially temporary map by means of exploration and repeatedly compares it with the map "first floor". Since this localization process fails, the robot completes the exploration of the second floor and then stores the new map under "map 2". The robot then carries out a cleaning operation of "map 2". The user then renames "map 2" as "second floor", again using the human-machine interface.

If the robot is subsequently shifted to the first floor, the robot can locate itself in "first floor" and can complete a cleaning operation previously terminated under certain circumstances in such a manner that only the areas which have previously not yet been cleaned are cleaned. Furthermore, each time the robot is shifted between the floors, a global self-localization process in the maps "first floor" and "second floor" is triggered. This allows the user to flexibly use the robot with permanent self-created maps.

Second Example the robot begins with the exploration of an apartment and in the process creates a map and stores the map under "map 1" after concluding the exploration. It then carries out a cleaning operation of "map 1" and returns to its base station after it has completed said operation. The user then gives the created map the name "apartment" using a human-machine interface. During its next cleaning operation, the user switches off the robot and carries it, including its base station, to another part of the apartment in order to achieve an improved appearance of the apartment. The user then switches the robot on again. The robot detects that it has been switched on and then detects that its sensor data do not match its position stored last in the map "apartment".

This event triggers a global self-localization process of the robot in "apartment". The robot again creates a new (temporary) map by means of exploration and repeatedly compares it with "apartment". In the event of successful localization in "apartment", the new map and the map "apartment" are meaningfully combined to form an updated map "apartment".

If localization fails, for example if the user has also repositioned several large objects in order to improve the appearance of the apartment in such a way that a sufficiently reliable localization process is not possible, the robot completes the new exploration and stores the newly created map under "map 2". The user then has the possibility of deleting the already existing map "apartment" and renaming "map 2" as "apartment".

The examples and technical features of the mobile robot which are described in connection with the treatment of a floor area can also be applied to a mobile robot for carrying out other activities. All activities which can be undertaken by autonomous self-propelled robots are conceivable in this case. These activities may comprise, for example, the inspection of the floor area or the environment, the transport of objects, the cleaning of air and/or the carrying out of entertainment games. The treatment module 140 described is accordingly designed in robots which carry out activities other than or in addition to the treatment of floors. In some cases, there is no need for a treatment module 140, for example when solely monitoring or inspecting rooms, areas or objects.

Whereas the invention was described using an exemplary refinement, the invention can accordingly be additionally modified within the fundamental concept and the scope of protection of this disclosure. The present application is therefore intended to cover numerous variants, possible uses or adaptations of the invention using its fundamental principles. In addition, the present application is intended to cover such deviations from the present disclosure which constitute known or conventional practice in the prior art on which the present invention is based. The invention is not restricted to the details stated above but rather can be modified according to the accompanying claims.

The invention claimed is:

1. A mobile self-propelled robot for autonomously carrying out activities, the robot comprising:
a drive module configured to move the robot over a floor area;
a treatment module configured to carry out the activities during operation of the robot;
at least one sensor module configured to acquire information relating to a structure of an environment;
a detector module configured to detect a shifting of the robot; and
a navigation module connected to said detector module and configured to navigate the robot over the floor area during operation of the robot using a map of the environment, to store and manage one or more maps of the environment, and to carry out a self-localization process when said detector module has detected a shifting of the robot;

wherein the self-localization process includes detecting whether and where the robot is situated within an area of the stored maps.

2. The robot according to claim 1, wherein said navigation module is also configured to create and store a new map based on data acquired by said sensor module when the robot is not located within a stored map.

3. The robot according to claim 1, wherein said navigation module carries out the self-localization process by determining global localization hypotheses in the stored maps.

4. The robot according to claim 3, wherein said navigation module is configured to determine a quality of the localization hypotheses in the stored maps.

5. The robot according to claim 1, which further comprises a communication module configured to establish a connection to a human-machine interface and for receiving user inputs via the connection.

6. The robot according to claim 1, wherein said detector module is configured to detect the shifting of the robot by detecting a lifting and a subsequent set-down of the robot.

7. The robot according to claim 6, which further comprises at least one contact switch on spring-loaded wheels and/or a reflection light barrier disposed on an underside of the robot and emitting a beam to be reflected at the floor, for detecting a lifting and subsequent set-down of the robot.

8. The robot according to claim 1, wherein said sensor module has an inertial sensor for recording movements of the robot and said detector module is configured to detect the shifting of the robot using the recorded movements.

9. The robot according to claim 1, wherein information acquired by said sensor module before being switched off is stored and the shifting of the robot is detected if the information acquired by said sensor module upon being switched back on differs from the stored information.

10. The robot according to claim 1, wherein the activities to be autonomously carried out comprise a treatment of a floor area and/or an inspection of an environment or objects in the environment and/or a transport of objects and/or a cleaning of air.

11. The robot according to claim 1, wherein the processing module is a cleaning module configured to clean a floor area under or beside the robot or both.

12. The robot according to claim 11, wherein the cleaning module comprises a collection container configured to draw in dust or dirt particles.

13. The robot according to claim 1, wherein the processing module is an inspection module configured monitor or inspect rooms, areas, or objects.

14. A method for automatically carrying out activities with a self-propelled autonomous robot, the method comprising:

storing and managing at least one map of an environment;
starting a treatment operation and carrying out the activities with a processing module arranged on the robot;
navigating the robot over the floor area during the treatment operation using a map of the environment;
acquiring information relating to a structure of the environment during the treatment operation by way of at least one sensor module arranged on or in the robot; and
carrying out a self-localization process if a detector module disposed on or in the robot detects that the robot has been shifted, the self-localization process determining whether and where the robot is situated within the stored maps.

15. The method according to claim 14, wherein navigating the robot comprises:

creating and storing a new map based on information relating to a structure of the environment acquired when the robot is not located within a store map.

16. The method according to claim 15, wherein navigating the robot comprises:

carrying out the self-localization process by determining global localization hypotheses in the stored maps.

17. The robot according to claim 16, wherein navigating the robot comprises:

determining a quality of the localization hypotheses in the stored maps.

18. The method according to claim 14, further comprising:

establishing a connection to a human-machine interface; and
receiving user inputs via the connection.

19. The method according to claim 14, wherein detecting that the robot has been shifted comprises:

detecting a lifting and a subsequent set-down of the robot.

20. The method according to claim 19, wherein detecting a lifting and subsequent set-down of the robot is accomplished using at least one of:

at least one contact switch on spring-loaded wheels; and
a reflection light barrier disposed on an underside of the robot and emitting a beam to be reflected at the floor.

21. The method according to claim 14, wherein acquiring information relating to a structure of the environment comprises: recording movements of the robot using an inertial sensor; and
wherein detecting that the robot has been shifted comprises: detecting the shifting of the robot using the recorded movements.

22. The method according to claim 14, wherein the acquiring information relating to a structure of the environment comprises:

storing the acquired information relating to a structure of the environment before the robot is switched off; and
detecting the shifting of the robot if the acquired information relating to a structure of the environment, which is obtained upon being switched back on, differs from the stored information.

23. The method according to claim 14, wherein the activities to be autonomously carried out comprise a treatment of a floor area and/or an inspection of an environment or objects in the environment and/or a transport of objects and/or a cleaning of air.

* * * * *